US008689081B2

(12) United States Patent
Yu et al.

(10) Patent No.: US 8,689,081 B2
(45) Date of Patent: Apr. 1, 2014

(54) TECHNIQUES FOR EMBEDDED MEMORY SELF REPAIR

(75) Inventors: Andy Yu, Castro Valley, CA (US); Pierre Chor-Fung Chia, Fremont, CA (US); ShiJie Wen, Sunnyvale, CA (US); Jie Xue, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 13/304,838

(22) Filed: Nov. 28, 2011

(65) Prior Publication Data

US 2013/0139033 A1 May 30, 2013

(51) Int. Cl.
*G11C 29/00* (2006.01)

(52) U.S. Cl.
USPC .......... 714/764

(58) Field of Classification Search
USPC .......... 714/723, 766, 763–764; 365/49.1, 365/185.09, 200
See application file for complete search history.

(56) References Cited

U.S. PATENT DOCUMENTS

| | | | |
|---|---|---|---|
| 5,758,056 A * | 5/1998 | Barr | 714/6.32 |
| 7,213,179 B2 | 5/2007 | Song et al | |
| 2009/0132876 A1* | 5/2009 | Freking et al. | 714/723 |

* cited by examiner

*Primary Examiner* — Shelly A Chase
(74) *Attorney, Agent, or Firm* — Edell, Shapiro & Finnan, LLC

(57) ABSTRACT

Techniques are provided for classifying and correcting errors in a bit sequence. At a memory control device, access is requested to a first bit sequences that is stored in a bit sequence database of a memory component and associated with an address. An error is detected in the first bit sequence, and the address associated with the bit sequence is compared to addresses stored in an address database of a content addressable memory component to determine if there is a match. When there is a match, the error is classified as a hard bit error. When there is not a match, the error is classified as a soft bit error.

25 Claims, 4 Drawing Sheets

TECHNIQUES FOR EMBEDDED MEMORY SELF REPAIR

TECHNICAL FIELD

The present disclosure relates to memory self-repair techniques.

BACKGROUND

Certain network processors may demand high performance and high bandwidth and density for embedded memories. There are significant reliability risks with large embedded memories in advanced semiconductor technology applications due to higher intrinsic defects and lower voltage margins. For example, memory hard failure rates can as much as double over its operating life. Self-repair of marginal, defective memory cells and hard failures during field operations optimize memory usage for network availability.

DESCRIPTION OF EXAMPLE EMBODIMENTS

Overview

Techniques are provided for classifying and correcting errors in a bit sequence stored in a memory device. A memory control device receives a request for access to a first bit sequence that is stored in a bit sequence database of a memory component and associated with an address. An error is detected in the first bit sequence, and the address associated with the bit sequence is compared to addresses stored in an address database of a content addressable memory component to determine if there is a match. When there is a match, the error is classified as a hard bit error. When there is not a match, the error is classified as a soft bit error.

Example Embodiments

Figure 1:
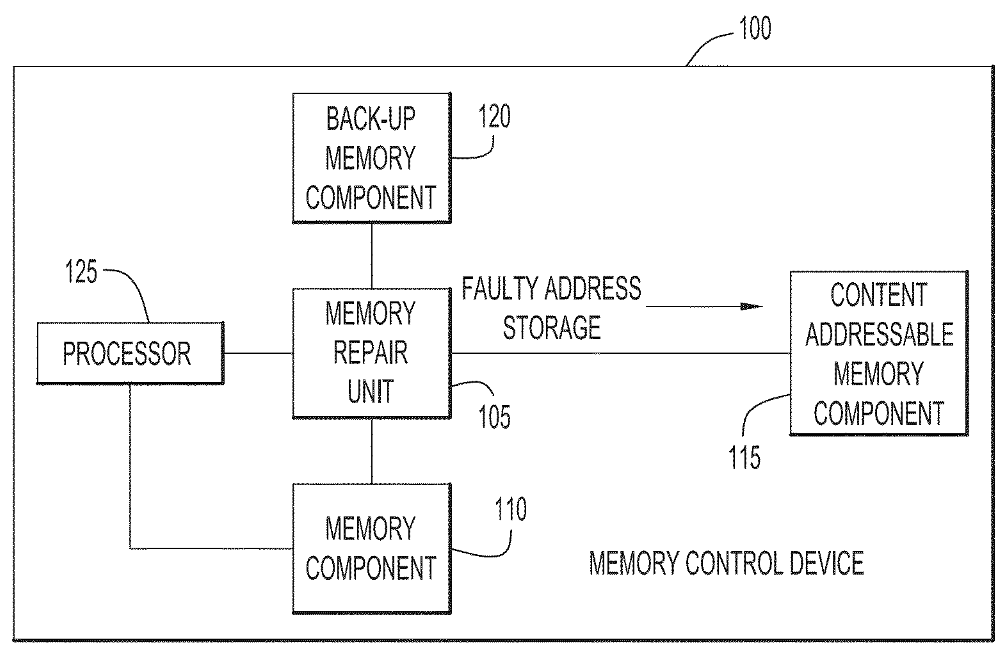
FIG. 1 shows an example memory control device with a content addressable memory component and a back-up memory component used to correct errors in bit sequences.

FIG. 1 shows an example memory control device 100 for use in a memory device. The memory control device 100 includes a memory repair unit in communication with a plurality of memory components. The memory repair unit is shown at reference numeral 105. The memory repair unit 105 is configured to access a memory component 110, a content addressable memory component 115 and a back-up memory component 120. The memory repair unit 105 is also coupled to a processor, shown at reference numeral 125. In general, at the instruction of the processor 125, the memory repair unit 105 is configured to detect any errors in bit sequences stored in the memory component 110 and is configured to correct these errors by accessing appropriate content from the content addressable memory component 115 and the back-up memory component 120. The memory repair unit 105, memory component 110, content addressable memory component 115, back-up memory component 120 and processor 125 may be separate components or may all reside within a single memory control device 100. For simplicity, these components are described herein as residing within the memory control device 100.

Figure 2:
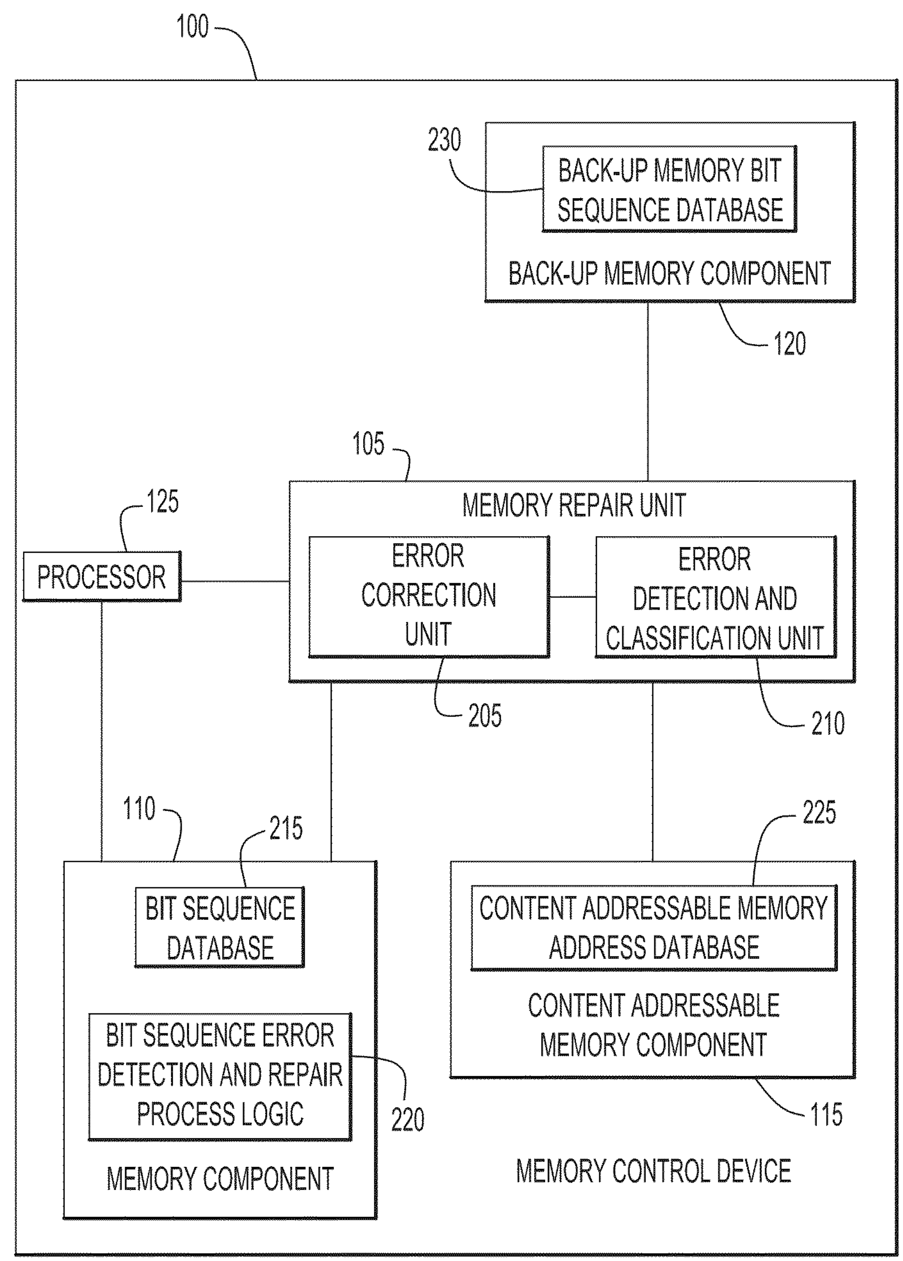
FIG. 2 is a block diagram of the memory control device configured to detect, classify and correct bit sequence errors.

Reference is now made to FIG. 2, which shows an expanded view of the components of the memory control device 100. The memory repair unit 105 of the memory control device 100 comprises an error correction unit 205 and an error detection and classification unit 210. The memory repair unit 105 is coupled to the processor 125 and to the memory component 110, which comprises a bit sequence database 215 and instructions a bit sequence error detection and repair process logic 220. The bit sequence database 215 is configured, for example, to store a sequence of bits (e.g., "bit sequence") at corresponding memory address locations. The processor 125 may make seek to access a bit sequence stored in the bit sequence database 215 and located at a memory corresponding address. For example, the processor may request a bit sequence at a memory address "0xABCD," and may access the bit sequence database 215 to obtain the bit sequence at that address. As described herein, upon a detecting an error in the bit sequence, the bit sequence error detection and repair process logic allows the memory repair unit 105 of the memory control device 100 to classify the error in the bit sequence as a soft or hard error, and enables the memory repair unit 105 to rectify and repair the error, when possible.

The memory repair unit 105 is also coupled to the content addressable memory component 115, which comprises a content addressable memory address database 225. As described in more detail herein, the content addressable memory address database 225 is configured to store address information associated with bit sequence errors detected by the memory repair unit 105. Based on the presence of an address in the content addressable memory address database 225, the memory repair unit 105 of the memory control device 100 can classify a bit sequence corresponding to the address as having a hard error or soft error.

The memory repair unit 105 is also coupled to the back-up memory component 120, which comprises a back-up memory bit sequence database 230. The back-up memory bit sequence database 230 is configured to store a back-up copy of bit sequences stored in the bit sequence database 215. As described herein, if a particular bit sequence in the bit sequence database 215 of memory component 110 contains an error classified as a hard error or failure (e.g., if there is physical damage to the memory component 110 such that the bit sequence cannot be retrieved), the memory repair unit 105 of the memory control device 100 can access the back-up memory bit sequence database 230 to provide the corresponding bit sequence without the hard error (e.g., the correct bit sequence) to the processor 125 or other requesting device.

It should be appreciated that the memory component 110, the content addressable memory component 115 and the back-up memory component 120 may be any type of memory unit. For example, the memory component 110 and the back-up memory component 120 may be static random access memory (SRAM) components or any memory components configured to store bit sequence data and configured to be embedded within a computer processor unit (CPU) or external to a CPU. Additionally, though the content addressable memory component 115 is shown as being a content addressable memory, it should be appreciated that any associative memory configured to store bit sequence address information may be used as the content addressable memory component 115. The memory component 110, content addressable memory component 115 and back-up memory component 120 may comprise read only memory (ROM), random access memory (RAM), magnetic disk storage media devices, optical storage media devices, flash memory devices, electrical, optical or other physical/tangible (non-transitory) memory storage devices.

As described above, the processor 125 is coupled to the memory repair unit 105. The processor 125 is also coupled to the memory component 110. The processor 125 is a microprocessor or microcontroller that is configured to execute program logic instructions (i.e., software) stored in the memory component 110 for carrying out various operations and tasks described herein. For example, the processor 125 is configured to execute the bit sequence error detection and repair process logic 220 that is stored in the memory component 110 to enable the memory repair unit 105 to detect errors in the bit sequence database 215, classify the errors as soft bit errors or hard bit errors and correct the errors when possible. The functions of the processor 125 may be implemented by logic encoded in one or more tangible (non-transitory) computer readable storage media (e.g., embedded logic such as an application specific integrated circuit, digital signal processor instructions, software that is executed by a processor, etc.), wherein the memory component 110 stores data used for the operations described herein and stores software or processor executable instructions that are executed to carry out the operations described herein.

The bit sequence error detection and repair process logic 220 may take any of a variety of forms, so as to be encoded in one or more tangible computer readable memory media or storage device for execution, such as fixed logic or programmable logic (e.g., software/computer instructions executed by a processor), and the processor 125 may be an application specific integrated circuit (ASIC) that comprises fixed digital logic, or a combination thereof.

For example, the processor 125 may be embodied by digital logic gates in a fixed or programmable digital logic integrated circuit, which digital logic gates are configured to perform the bit sequence error detection and repair process logic 220. The bit sequence error detection and repair process logic 220 may generally be embodied in one or more computer readable storage media encoded with software comprising computer executable instructions and when the software is executed operable to perform the operations described herein for the process logic 220.

In general, as stated above, the processor 125 (or other device) may request to access a bit sequence located at a particular memory address. Under normal operations, the bit sequence database 215 provides the processor 125 with appropriate bit sequences corresponding to memory addresses. However, at times, the processor 125 may receive a bit sequence with one or more errors from the bit sequence database 215. For example, a bit sequence may have a mistranslated error in a datum, where one or more bits in the bit sequence that is intended to be represented by a binary "on" state (e.g., a "1" digit) may be represented by an "off" state (e.g., a "0" digit) or vice versa. A bit sequence may also have unreadable errors in the datum, where one or more bits cannot be determined or evaluated. At other times, portions or entire segments of bit sequences may be missing.

The errors in the bit sequence may be soft errors or hard errors. Soft errors are typically non-repeatable errors in a bit sequence caused by, for example, changes to data (e.g., electrons in a storage circuit) in the bit sequence database 215. Hard errors, on the other hand are typically caused by physical damage to a storage circuit itself or other parts of the memory component 110. Thus, hard errors are typically repeated upon subsequent requests for bit sequence access due to the physical damage to the memory component 110, while soft errors are typically seldom repeated due to errors in software or data. When a processing device encounters hard errors in bit sequences, the errors are repeated every time that the bit sequence is requested, which can result in degraded or disrupted bit sequence retrieval.

The techniques described herein alleviate these problems by enabling the memory control device 100 to classify errors in the bit sequence database 215 as either soft errors or hard errors, and based upon such classification, the memory control device 100 is able to correct such errors to prevent repeated errors from appearing in the bit sequences requested by the processor 125. In one example, if the error is classified as a hard error, the error correction unit 205 of the memory repair unit accesses the back-up memory component 120 to retrieve a back-up, error-free copy of the bit sequence associated with the memory address of the bit sequence with the error. If the error is classified as a soft error, the error may be ignored, allowing the processor 125 to later request access to the bit sequence. In this example, a soft error may later be reclassified as a hard error by the memory repair unit 105 if the error is repeated after a predetermined number of times.

Figure 3A:
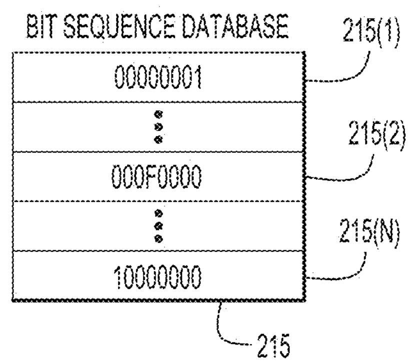
FIGS. 3A-3C show examples of databases stored in the memory component, content addressable memory component and back-up memory component of the memory control device, respectively.
Figure 3B:
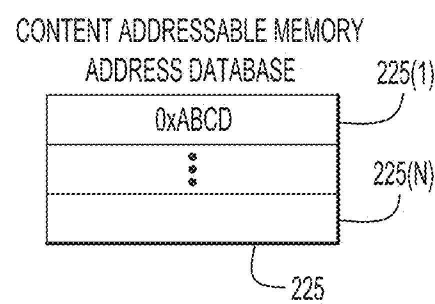
Figure 3C:
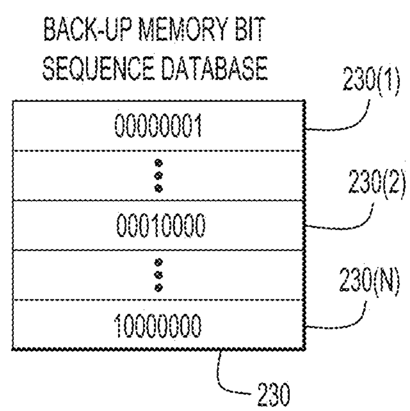

Reference is now made to FIGS. 3A-3C, which show examples of databases in the memory component 110, content addressable memory component 115 and back-up memory component 120, respectively. FIG. 3A shows the bit sequence database 215 stored in the memory component 110. As shown, the bit sequence database 215 stores a plurality of bit sequences 215(1)-215(N). One or more of the bit sequences in the bit sequence database 215 may contain an error, as shown by bit sequence 215(2). Bit sequence 215(2) may represent a bit sequence with a mistranslated or unreadable bit or datum, and the error in bit sequence 215(2) may be a soft error or a hard error. FIG. 3B shows the content addressable memory database 225 of the content addressable memory component 115. As described above, the content addressable memory database may store one or more memory addresses 225(1)-225(N) corresponding to bit sequences with errors that are stored in the bit sequence database 215. For example, memory address 225(1) may correspond to the memory address associated with bit sequence 215(2) that contains an error, while memory address 225(N) may correspond to another bit sequence that contains an error. FIG. 3C shows the back-up memory bit sequence database 230, which stores back-up copies 230(1)-230(N) of the bit sequences in the bit sequence database 215, without bit sequence errors. For example, back-up memory bit sequence 230(2) may correspond to the bit sequence 215(2) located at the memory address 225(1). In this example, the back-up memory bit sequence 230(2) does not contain the error in the bit sequence 215(2), and thus, back-up memory bit sequence 230(2) can be used as a replacement bit sequence for bit sequence 215(2).

Figure 4:
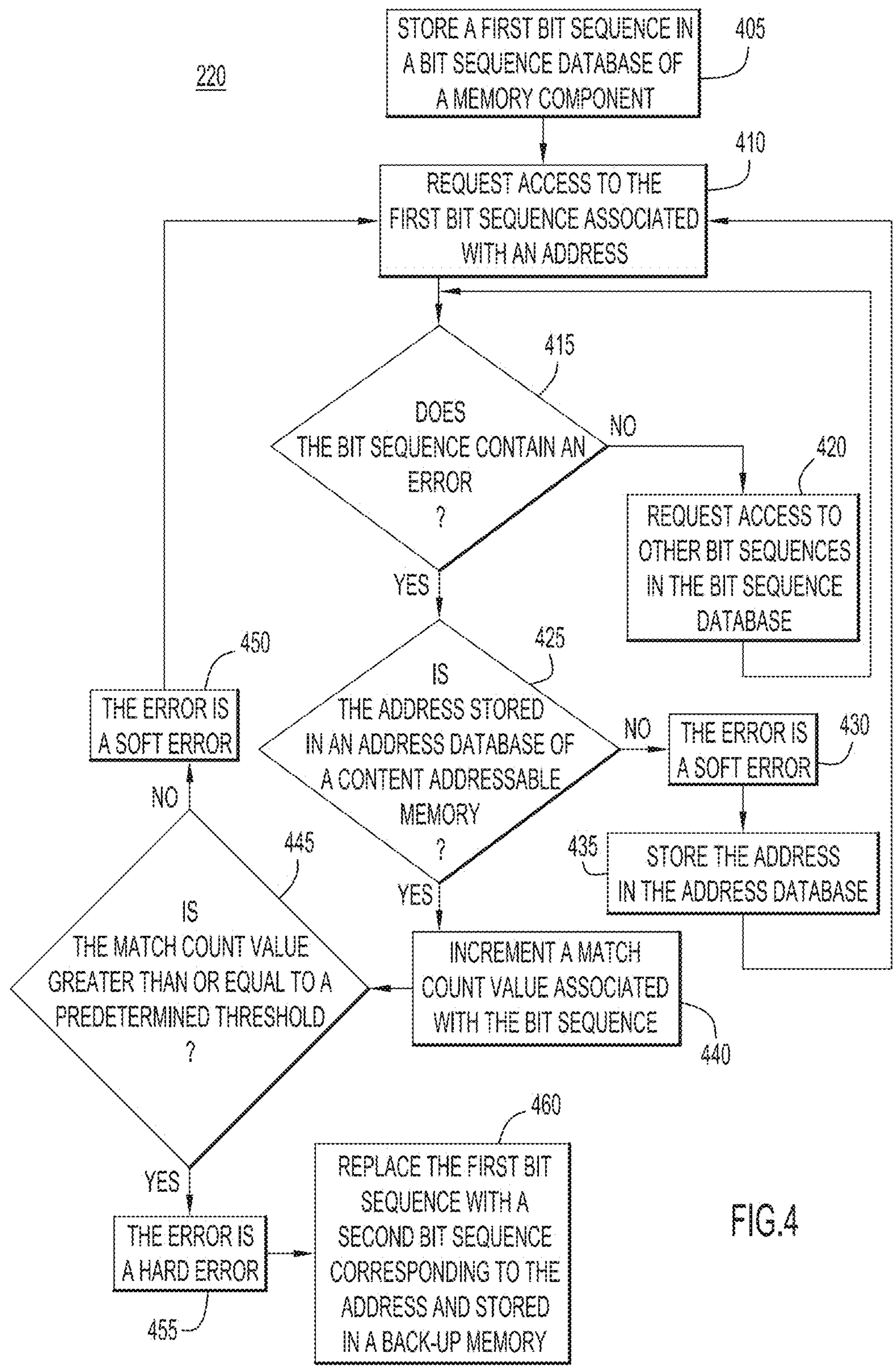
FIG. 4 is a flow chart depicting operations of the memory control device to detect and repair errors in a bit sequence database using the content addressable memory and the back-up memory.

Reference is now made to FIG. 4, which shows a flow chart depicting operations of the bit sequence error detection and repair process logic 220 of the memory component 110. At operation 405, a first of a plurality of bit sequences is stored in the bit sequence database 215, and at 410, a device (e.g., processor 125) may request the first bit sequence associated with a memory address. At operation 415, the processor 125 causes the error detection and classification unit 210 of the memory repair unit 105 to determine whether the first bit sequence contains an error. As described above, the memory repair unit 105 can determine whether the first bit sequence contains a mistranslated or unreadable bit or datum in the first bit sequence. If the first bit sequence does not contain an error, the processor 125 or other device continues to request access to other bit sequences in the bit sequence database 215, as shown in 420. If the first bit sequence does contain an error (i.e., if the answer to decision 415 is "yes"), the error detection and classification unit 210 (at the direction of the processor 125) determines, at 425, whether the memory address associated with the first bit sequence is stored in an address database (e.g., the content addressable memory address database 225) of the content addressable memory component 115.

If the address is not stored in the content addressable memory address database 225, the error detection and classification unit 210, at 430, classifies the error as a soft error, and at 435 stores the memory address in the content addressable memory address database 225, and the process reverts to operation 410. If the address is stored in the content addressable memory address database 225 (i.e., if the answer to decision 425 is "yes"), the error detection and classification unit 210, at 440, increments a match count value associated with the first bit sequence to indicate that the memory address matches one of the memory addresses in the content addressable memory address database 225.

After incrementing the match count value associated with the first bit sequence, the error detection and classification unit 210 determines, at 445, whether the match count value is greater than or equal to a predetermined threshold match count value. In other words, the error detection and classification unit compares the number of times that an error has been detected in the first bit sequence with an acceptable, predetermined number of error detections. If the match count value is less than the predetermined threshold, at 450, the error is classified as a soft error, and the process reverts to operation 410.

If the match count value is greater than or equal to the predetermined threshold, then the number of times that the error has been detected in the first bit sequence is greater than the acceptable number of error detections, and at 455, the error is classified as a hard error. After the error is classified as a hard error, a storage circuit corresponding to the address of the first bit sequence may be deactivated, and at 460, the error correction unit 205 (at the instruction of the processor 125) replaces the first bit sequence with a second bit sequence from the back-up memory bit sequence database 230 corresponding to the memory address of the first bit sequence. Thus, as described in FIG. 4, the memory control device 100 can classify a bit sequence having an error as a hard error or soft error by comparing the memory address information corresponding to the bit sequence with stored memory addresses in the content addressable memory component 115. If the address is found in the content addressable memory component 115 a number of times above the predetermined threshold, the corresponding bit sequence is classified as having a hard bit error (e.g., that there is physical damage to the memory component 110 causing the repeated errors) Likewise, if the address is not found in the content addressable memory component 115 or is found in the content addressable memory component 115 a number of times below the predetermined threshold, the corresponding bit sequence is classified as having a soft bit error (e.g., based on data or other software disruption related to the memory component 110).

It should be appreciated that the techniques described above in connection with all embodiments may be performed by one or more computer readable storage media that is encoded with software comprising computer executable instructions to perform the methods and steps described herein.

In sum, a method is provided comprising: at a memory control device, requesting access to a first bit sequence stored in a bit sequence database of a memory component and associated with an address; detecting an error in the first bit sequence; comparing the address to addresses stored in an address database of a content addressable memory component to determine if there is a match; when there is a match, classifying the error as a hard bit error; and when there is not a match, classifying the error as a soft bit error.

In addition, one or more computer readable storage media is provided that is encoded with software comprising computer executable instructions and when executed operable to: request access to a first bit sequence stored in a bit sequence database of a memory component and associated with an address; detect an error in the first bit sequence; compare the address to addresses stored in an address database of a content addressable memory component to determine if there is a match; classify the error as a hard bit error when there is a match; and classify the error as a soft bit error when there is not a match.

Furthermore, an apparatus is provided comprising: a memory repair unit; a memory component coupled to the memory repair unit; a content addressable memory component coupled to the memory repair unit; a back-up memory component coupled to the memory repair unit; and a processor coupled to the memory repair unit and to the memory component and further configured to: request access to a first bit sequence stored in a bit sequence database of the memory component and associated with an address; detect an error in the first bit sequence; compare the address to addresses stored in an address database of the content addressable memory component to determine if there is a match; classify the error as a hard bit error when there is a match; and classify the error as a soft bit error when there is not a match.

The above description is intended by way of example only. Various modifications and structural changes may be made therein without departing from the scope of the concepts described herein and within the scope and range of equivalents of the claims.

What is claimed is:

1. A method comprising:

at a memory control device, requesting access to a first bit sequence stored in a bit sequence database of a memory component and associated with an address;

detecting an error in the first bit sequence;

comparing the address to addresses stored in an address database of a content addressable memory component to determine if there is a match;

when there is a match:

classifying the error as a hard bit error;

retrieving a back-up copy of the first bit sequence without the error; and replacing the first bit sequence with the back-up copy; and when there is not a match:

determining whether the error in the first bit sequence has been previously detected by the memory control device;

classifying the error as a soft bit error and ignoring the error if the error was not previously detected by the memory control device; and classifying the error as a hard bit error if the error was previously detected by the memory control device.

2. The method of claim 1, further comprising replacing the first bit sequence stored in the memory component with a second bit sequence corresponding to the address and stored in a back-up memory component when the error is classified as a hard bit error.

3. The method of claim 2, wherein replacing comprises replacing the first bit sequence with the second bit sequence stored in a back-up static random access memory (SRAM) component.

4. The method of claim 1, further comprising storing the address in the address database when the error is classified as a soft bit error.

5. The method of claim 4, further comprising reclassifying the error as a hard bit error when during a subsequent request for the first bit sequence associated with the address, an error is detected in the first bit sequence and the address matches one of the addresses stored in the address database.

6. The method of claim 1, further comprising:
- storing a number of matches between the address and the addresses stored in the address database; and
- classifying the error as a hard bit error if the number of matches is greater than or equal to a predetermined threshold value.

7. The method of claim 6, further comprising classifying the error as a soft bit error if the number of matches is less than the predetermined threshold value.

8. The method of claim 1, further comprising deactivating a circuit of a processor corresponding to the address when the error is a hard bit error.

9. The method of claim 1, wherein requesting comprises requesting access to the first bit sequence stored in the first bit sequence database of a static random access memory (SRAM) component.

10. One or more computer non-transitory readable storage media encoded with software comprising computer executable instructions and when the software is executed operable to:
- request access to a first bit sequence stored in a bit sequence database of a memory component and associated with an address;
- detect an error in the first bit sequence;
- compare the address to addresses stored in an address database of a content addressable memory component to determine if there is a match;
- when there is a match:
  - classify the error as a hard bit error;
  - retrieve a back-up copy of the first bit sequence without the error; and
  - replace the first bit sequence with the back-up copy; and
- when there is not a match:
  - determine whether the error in the first bit sequence has been previously detected;
  - classify the error as a soft bit error and ignore the error if the error was not previously detected by the memory control device; and
  - classify the error as a hard bit error if the error was previously detected.

11. The computer readable storage media of claim 10, further comprising instructions operable to replace the first bit sequence stored in the memory component with a second bit sequence corresponding to the address and stored in a back-up memory component when the error is classified as a hard bit error.

12. The computer readable storage media of claim 11, wherein the instructions operable to replace comprise instructions operable to replace the first bit sequence with the second bit sequence stored in a back-up static random access memory (SRAM) component.

13. The computer readable storage media of claim 10, further comprising instructions operable to store the address in the address database when the error is classified as a soft bit error.

14. The computer readable storage media of claim 13, further comprising instructions operable to reclassify the error as a hard bit error when during a subsequent request for the first bit sequence associated with the address, an error is detected in the first bit sequence and the address matches one of the addresses stored in the address database.

15. The computer readable storage media of claim 10, further comprising instructions operable to:
- store a number of matches between the address and the addresses stored in the address database; and
- classify the error as a hard bit error if the number of matches is greater than or equal to a predetermined threshold value.

16. The computer readable storage media of claim 15, further comprising instructions operable to classify the error as a soft bit error if the number of matches is less than the predetermined threshold value.

17. The computer readable storage media of claim 10, further comprising instructions operable to deactivate a circuit of a processor corresponding to the address when the error is a hard bit error.

18. The computer readable storage media of claim 10, further comprising instructions operable to request access to the first bit sequence stored in the first bit sequence database of a static random access memory (SRAM) component.

19. An apparatus comprising:
- a memory repair unit;
- a memory component coupled to the memory repair unit;
- a content addressable memory component coupled to the memory repair unit;
- a back-up memory component coupled to the memory repair unit; and
- a processor coupled to the memory repair unit and to the memory component and further configured to:
  - request access to a first bit sequence stored in a bit sequence database of the memory component and associated with an address;
  - detect an error in the first bit sequence;
  - compare the address to addresses stored in an address database of the content addressable memory component to determine if there is a match;
  - when there is a match:
    - classify the error as a hard bit error;
    - retrieve a back-up copy of the first bit sequence without the error; and
    - replace the first bit sequence with the back-up copy; and
  - when there is not a match:
    - determine whether the error in the first bit sequence has been previously detected;
    - classify the error as a soft bit error and ignore the error if the error was not previously detected by the memory control device; and
    - classify the error as a hard bit error if the error was previously detected.

20. The apparatus of claim 19, wherein the processor is further configured to replace the first bit sequence stored in the memory component with a second bit sequence corresponding to the address and stored in a back-up memory component when the error is classified as a hard bit error.

21. The apparatus of claim 20, wherein the processor is further configured to replace the first bit sequence with the second bit sequence stored in a back-up static random access memory (SRAM) component.

22. The apparatus of claim 19, wherein the processor is further configured to store the address in the address database when the error is classified as a soft bit error.

23. The apparatus of claim 22, wherein the processor is further configured to reclassify the error as a hard bit error when during a subsequent request for the first bit sequence associated with the address, an error is detected in the first bit sequence and the address matches one of the addresses stored in the address database.

24. The apparatus of claim 19, wherein the processor is further configured to:

store number of matches between the address and the addresses stored in the address database; and classify the error as a hard bit error if the number of matches is greater than or equal to a predetermined threshold value.

25. The apparatus of claim 24, wherein the processor is further configured to classify the error as a soft bit error if the number of matches is less than the predetermined threshold value.

* * * * *